June 8, 1926.  G. W. BURDIN ET AL  1,588,306
CANE CULTIVATOR
Filed May 23, 1925  2 Sheets-Sheet 2
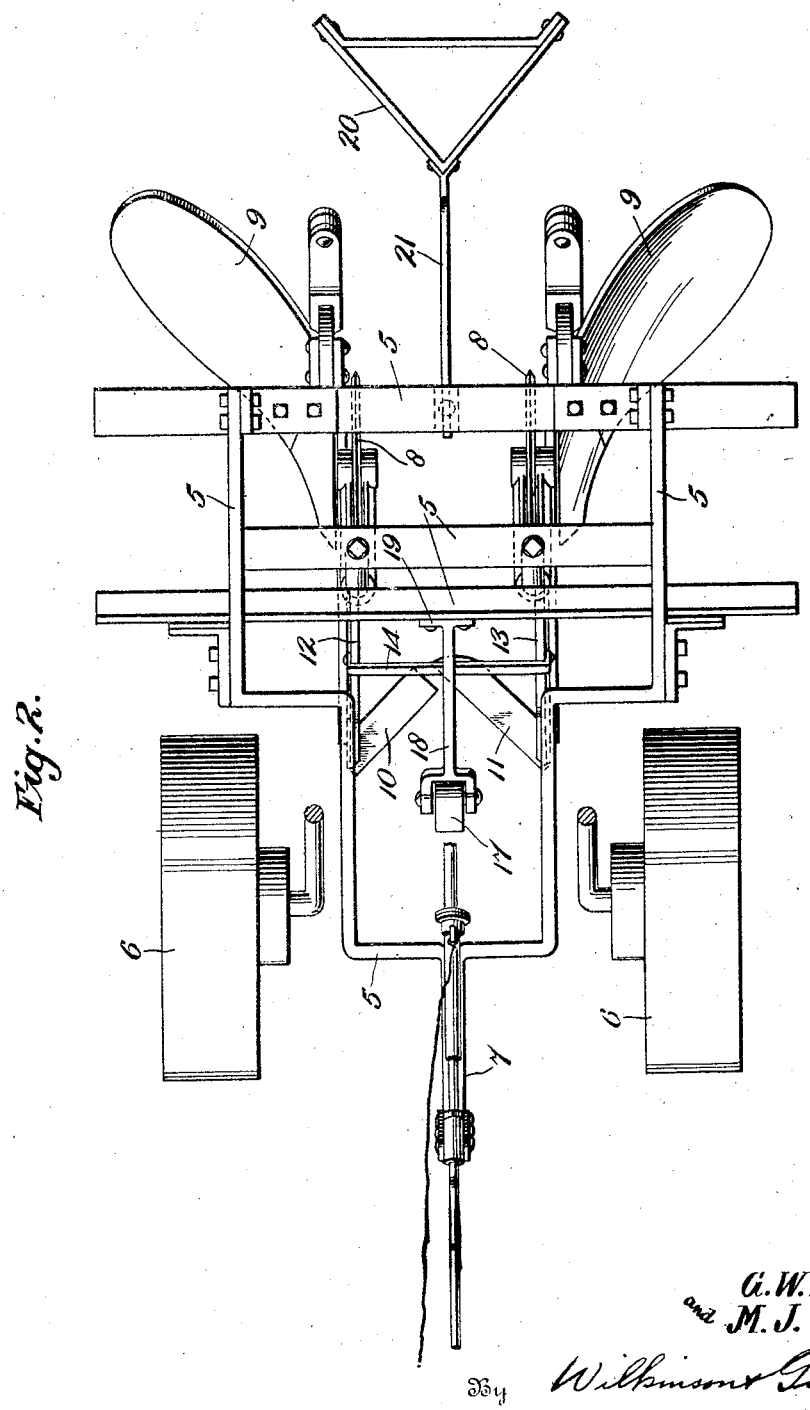
Inventor
G. W. Burdin
and M. J. Landry
By Wilkinson & Gusta
Attorneys Patented June 8, 1926.

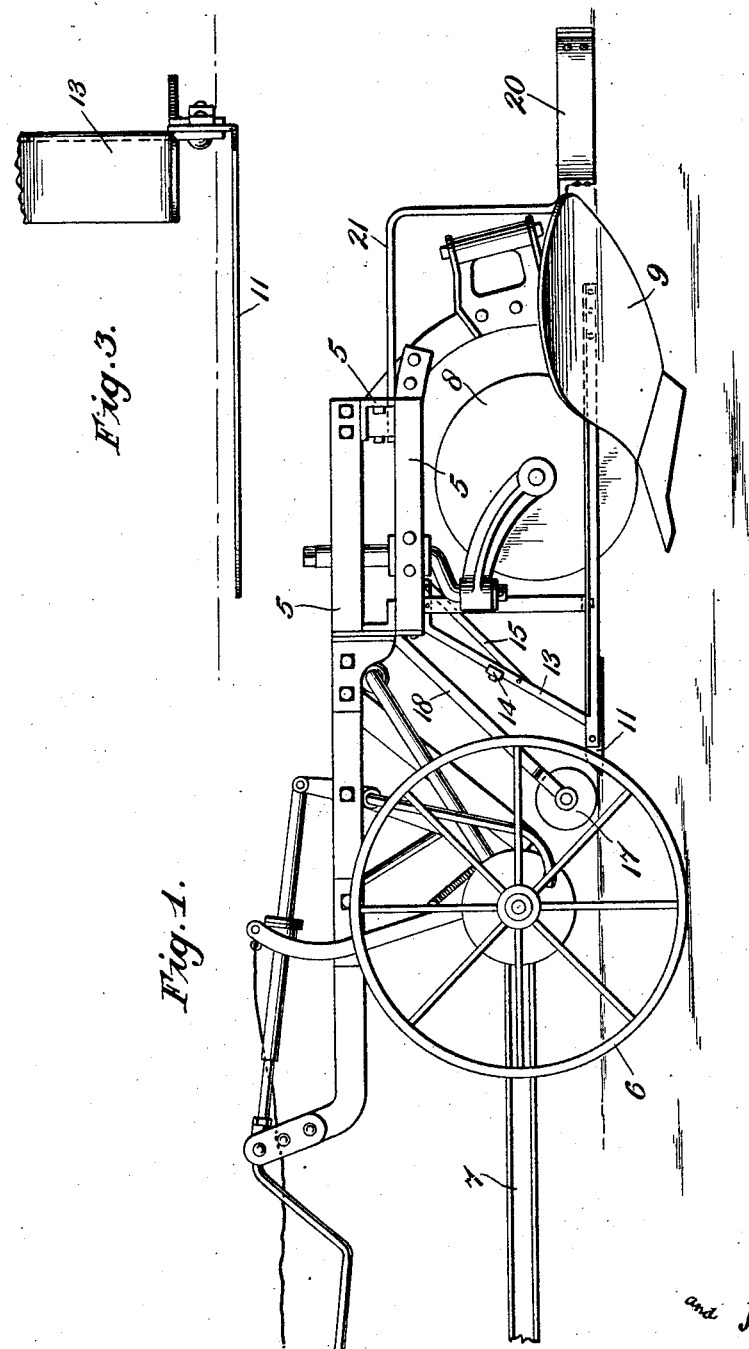

1,588,306

UNITED STATES PATENT OFFICE.

GROVER WADE BURDIN AND MAURICE J. LANDRY, OF ST. MARTINSVILLE, LOUISIANA.

CANE CULTIVATOR.

Application filed May 23, 1925. Serial No. 32,353.

This invention relates to cane cultivators and has for it principal object to provide an attachment for cultivators of this character whereby the operations of shaving, off-barring and cleaning up a row of cane may be greatly facilitated.

A further object of the invention is to provide an apparatus for accomplishing the above named operations which may be readily incorporated in new cultivators or which may be readily applied to cultivators which are already in use.

In cane cultivation, it is common practice at certain periods to cut off or shave the tops of the rows of cane, after which the said rows are off-barred, i. e., the edge of the row on each side is cut off by a plow, making the row anywhere from 8 to 20 inches or more in width with square substantially vertical edges of from 3 to 6 inches in height. Heretofore, these operations have been performed separately, as well as any subsequent cleaning of the top of the row, which method of operation has resulted in consumption of a great amount of time. On the other hand, by employing the attachment constituting the present invention with the usual cultivator which performs the off-barring operation, it is possible to shave, off-barr and clean the top of the row in a single operation with a consequent material saving in time.

With the above and other objects in view which will appear as the description proceeds, the invention consists in the novel details of construction, and combinations and arrangements of parts, more fully and hereinafter described and particularly pointed out in the appended claim.

Referring to the accompanying drawings, forming a part of this specification, in which like reference characters designate like parts in all the views;

Fig. 1 is a side elevational view of one form of well known cane cultivator, with the shaving and cleaning attachments constituting the present invention, shown attached thereto;

Fig. 2 is a top plan view of the parts shown in Fig. 1; and,

Fig. 3 is an enlarged detail front elevational view of one of the shaving blades and its contiguous parts.

Inasmuch as the cultivator proper constitutes no part of the present invention, it will only be described generally as comprising a frame 5 adjustably supported upon the wheels 6 in any of the usual and well known manners and provided with a tongue 7 by means of which it may be made to travel over the ground by a tractor or by horse power, as desired. Suitably supported beneath this frame 5, is a pair of cultivator discs 8 and adjacent thereto, is a pair of plow shares 9. These discs and plow shares constitute the usual and well known earth working elements for performing the off-barring operation and they will be hereinafter referred to as the off-barring elements.

The elements forming the attachments constituting the present invention, comprise a pair of shaver blades 10 and 11, arranged in a substantially horizontal plane and angularly disposed relatively to one another as clearly shown in Fig. 2. These said blades, the forward edges of which are preferably sharpened to facilitate their action, are supported beneath the frame 5, by means of downwardly inclined arms 12 and 13 respectively, the upper ends of which may be secured to the frame 5 in any suitable manner. These said arms are preferably braced by suitable braces 14 and 15, as will be clear from the drawings, to provide a substantially rigid construction.

A rolling coulter wheel 17 is mounted slightly in advance of the shaving blades 10 and 11 by means of a downwardly inclined supporting arm 18, the upper end of which is rigidly secured as at 19 to a portion of the frame 5. This wheel acts to break the surface of the earth just in advance of the shaving blades 10 and 11, whereby their action may be facilitated.

In order to clean off the top of the row after it has been subjected to the shaving and off-barring operations, there is provided to the rear of the off-barring elements 8 and 9, a substantially triangular shaped fluke 20 which is also supported by the frame 5 by means of an arm 21, one end of which is rigidly secured to the said frame. It will be readily apparent that owing to the triangular or V shape of this fluke, and to its location to the rear of the other elements, that as it passes over the top of the row after the latter has been shaved and off-barred, that the said fluke will force any lumps of earth or shavings from the blades 10 and 11 to either side of the row, thereby leaving the top of the row clean.

It is believed that the operation of the device will be clear from the foregoing, it being understood that the cultivator is moved along a row in the usual manner during which movement the rolling coulter 17 will first break the earth on the top of the row, whereupon the angularly disposed horizontal shaving blades 10 and 11 will cut off the tops of any stubbles or plant canes with which they may come in contact, and that subsequent thereto, the sides of the row will be off-barred in the usual manner by the off-barring elements 8 and 9, after which the V shaped fluke 20 will clean off the top of the row by forcing any shavings or earth lumps to the side thereof.

It will be readily apparent that this attachment may be readily incorporated in new cultivators of various types or that it may with equal facility be applied to cultivators which are already in use. Furthermore, that by employing the shaving and cleaning elements, the various operations of shaving, off-barring and cleaning, may all be accomplished at one time with a consequent material saving in time.

While one form of the invention has been illustrated and described, it will be obvious that those skilled in the art may vary the details of construction as well as the precise arrangement of parts without departing from the spirit of the invention and therefore, it is not wished to be limited to the above disclosure, except as may be limited by the claim.

What is claimed is:

The combination, with a cane cultivator comprising a frame, supporting wheels therefor, and off-barring earth working elements carried by said frame, of a pair of horizontal angularly disposed shaver blades carried by said frame in advance of said off-barring elements, adapted to shave off the top of a row of plant canes, stubbles, and the like; a coulter wheel carried by said frame, adapted to break the ground in advance of said shaver blades; and a fluke also carried by said frame, for smoothing off the top of the row subsequent to the action of said off-barring elements.

G. WADE BURDIN.
MAURICE J. LANDRY.